United States Patent
Harnetiaux

(10) Patent No.: US 7,237,495 B2
(45) Date of Patent: Jul. 3, 2007

(54) METHOD AND APPARATUS FOR BLOCKING AIR FROM A SEED PLANTER

(75) Inventor: Travis Harnetiaux, Woodridge, IL (US)

(73) Assignee: CNH America LLC, New Holland, PA (US)

( * ) Notice: Subject to any disclaimer, the term of this patent is extended or adjusted under 35 U.S.C. 154(b) by 952 days.

(21) Appl. No.: 10/677,447

(22) Filed: Oct. 2, 2003

(65) Prior Publication Data

US 2006/0180063 A1    Aug. 17, 2006

(51) Int. Cl.
*A01C 7/00* (2006.01)
*A01C 9/00* (2006.01)

(52) U.S. Cl. .................. 111/174; 111/200; 111/900

(58) Field of Classification Search ............ 111/149, 111/157, 163–170, 174–187, 191–196, 200, 111/900; 221/211
See application file for complete search history.

(56) References Cited

U.S. PATENT DOCUMENTS

| 4,872,785 | A | * | 10/1989 | Schrage et al. ............. 406/155 |
| 5,517,932 | A | * | 5/1996 | Ott et al. .................... 111/193 |
| 6,109,193 | A |   | 8/2000 | Crabb et al. |
| 6,401,638 | B1 | * | 6/2002 | Crabb et al. ................ 111/185 |

* cited by examiner

*Primary Examiner*—Christopher J. Novosad
(74) *Attorney, Agent, or Firm*—Rebecca Henkel

(57) ABSTRACT

A seed planting assembly is provided having a plurality of planting units that are connected to an air moving system for drawing air through an air metering assembly located in each planting unit via a conduit connecting each air metering assembly to an air mover unit. An air blocking system is provided for blocking airflow in the conduit associated with one or more predetermined planting units.

20 Claims, 7 Drawing Sheets

METHOD AND APPARATUS FOR BLOCKING AIR FROM A SEED PLANTER

CROSS-REFERENCE TO RELATED APPLICATIONS

None

STATEMENT REGARDING FEDERALLY SPONSORED RESEARCH OR DEVELOPMENT

None

BACKGROUND OF THE INVENTION

The present invention generally relates to seed planting units using air pressure differential seed metering assemblies, and in particular, relates to a method and apparatus for selectively disconnecting an air pressure source from one or more seed metering assemblies.

Seed planting units generally include a laterally extending tool bar that supports a plurality of parallel planting units (also known as row units). The tool bar is typically coupled to a tractor or like vehicle suitable for towing the planting assembly along a field that is to be cultivated. Each planting unit includes a device for opening a furrow in the ground as the tractor draws the tool bar across a field to be seeded. Each planting unit further includes a seed meter to dispense seeds at a controlled rate into a seed furrow as the meter is advanced above and along the seed furrow during operation. One such seed metering assembly is described in U.S. Pat. No. 6,401,638 assigned to Case Corp., Racine, Wis., the disclosure of which is hereby incorporated by reference for the purpose of general background information. Generally seeds are delivered to the metering assembly from a seed hopper located on the planting unit or, alternatively, from a smaller container fed from a centralized large hopper used to feed all or a portion of the planting units. Each planting unit further includes a closing assembly that moves soil at the sides of the furrow to close the furrow over the planted seeds. Adjacent planting units are laterally spaced a sufficient distance to form furrows that are spaced a corresponding distance apart that is suitable for the type of seed being planted.

Air pressure differential seed meters, which are commonly known as air seed meters, are generally of two types, the first being a positive pressure type meter, and the second relying upon negative pressure or a vacuum. A positive pressure air seed metering mechanism includes a rotating disc defining apertures extending therethrough that are sized to retain one or more seeds to be planted. The metering mechanism is connected to an air mover that blows air into the seed chamber and onto the surface of the disc. The high pressure caused by the air mover creates a high pressure in the chamber that forces seeds from a seed mass into the apertures where they are retained for subsequent release into the furrow as the seed member rotates. In particular, the apertures open to atmosphere where the individual seeds are held by the blowing air until the seeds are dispensed by interrupting the flow of air to the seeds.

While positive pressure air seed meters offer certain advantages over conventional mechanical seed meters, they have certain limitations that need to be addressed during operation. In particular, a relatively high pressure differential must be applied to the disc in order to fill each hole or opening with the seed to ensure that a given furrow contains the appropriate number of seeds needed to produce a full yield. Accordingly, the seed hopper must be sealed to maintain pressure in the system. If for any reason the hopper lid comes off or the hopper otherwise becomes unsealed, the pressure differential at each planting unit will be reduced thereby jeopardizing reliable planting operation. Furthermore, the positive pressure is forced through the seed mass prior to engaging the apertures. Accordingly, the seed mass inhibits the efficiency of airflow into the meter.

Vacuum seed meters were therefore introduced to overcome some of the deficiencies in positive pressure seed meters and offer enhanced control over the seed being transported by the seed disc. In vacuum seed meters, a vacuum source is typically coupled to a separate chamber on the opposite side of the seed disc from the seed mass in the metering assembly. The vacuum pressure communicates through the apertures in the seed disc, and is sufficiently strong to draw the seed mass into the seed disc apertures. The seeds are held in the apertures until the disc rotates the seeds to the seed discharge area of the metering mechanism. The openings between the outer surface of the seeds and the periphery of the openings in the disc allows air to pass through, thereby maintaining the seeds in operable association with the disc. Because the pressure differential at the seed disc is provided by a vacuum source on the opposite side with respect with respect to the seed mass, and not from the flow of air at the same side as with positive pressure seed metering mechanisms, the difficulty of directing an air flow through the seed mass onto the seed disc is eliminated.

Regardless of the type of air seed meter being used, the total available air pressure usable in combination with the seed meter is limited by the air moving capacity of the air mover. It should be appreciated that the available air pressure available to each seed meter is thus a function of the quantity of metering assemblies included in the seed planting assembly. Typically, a second air mover is installed such that each air mover is responsible for delivering a pressure differential to a portion of the planting units in the assembly. It is common for thirty-one such planting units to be connected to the tool bar of a planting unit, such that fifteen planting are connected to a single air mover at a given time.

During a planting operation, the desired spacing between adjacent furrows can vary depending upon the type of seed being planted. In a typical arrangement, all thirty-one planting units are spaced along the toolbar at a sufficient distance to accommodate seeds that can be planted in narrowly spaced adjacent furrows to maximize the crop yield. Examples of such seeds include soybeans. Other types of seeds, such as corn, require that the distance between adjacent furrows be increased. The increased distance is typically accomplished by disengaging every other seed planting unit, thereby doubling the lateral distance between adjacent furrows that are created during operation.

Seed planting units can be disengaged, for example, by raising each unit upwardly about the tool bar and above ground level to prevent the planting unit from forming a furrow. The seeds are also removed from the hopper corresponding to that furrow or, if a centralized hopper is used, each raised planter can be operatively disconnected from the centralized hopper. It should thus be appreciated that a portion of the available air pressure for the metering assemblies would be wasted if permitted to travel into the metering assemblies of those planting units that have been raised. Because the limited supply of air pressure is valuable to enable reliable metering for those engaged planting units, it is desirable to redirect air pressure that would be used for disengaged planting units to those planting units that remain engaged during a planting operation.

Conventional seed planters use complicated valving that can be actuated to summarily block the passage of air pressure into every other seed planter that would be raised to increase the distance between adjacent furrows. The air is thus inherently redirected to those metering assemblies that remain operatively coupled to the air mover. Unfortunately, such valving assemblies are unnecessarily complex and expensive, and do not lend themselves suitable for modifying seed planters that have already been fabricated without the valving. Moreover, the valving does not enable the user to selectively determine which individual planting units are to be disengaged. Accordingly, if a planting unit is determined to be faulty, the user might not be able to include that planting unit among those to be raised and disconnected from the air mover.

What is therefore needed is a method and apparatus for selectively disconnecting individual planting units from the air mover for the purposes of disengaging the corresponding metering mechanism having less complexity and cost associated with fabrication of the apparatus. It would further be desirable to equip existing seed planters with the capability to selectively disengage planting units from the air mover.

SUMMARY OF THE INVENTION

In accordance with one aspect of the present invention, a seed planting assembly is provided for forming a furrow, delivering seeds into the furrow, and closing the furrow. The assembly includes 1) a furrow opening assembly operable to create a furrow, 2) a metering assembly operable to receive seeds and deliver seed into the furrow under forced air pressure, wherein the metering assembly includes an air inlet, and 3) a furrow closing assembly disposed downstream of the furrow opening assembly operable to close the furrow. The seed planting assembly further includes an air moving assembly having an air moving unit coupled to a first end of a conduit. The conduit defines a second end that is removably connected to the metering assembly air intake. An air blocking assembly defines a sealing member configured to engage the second end of the conduit when the conduit is not connected to the metering assembly to provide a seal preventing air flow through at least a portion of the conduit.

The foregoing and other aspects of the invention will appear from the following description. In the description, references made to the accompanying drawings which form a part hereof, and in which there is shown by way of illustration, and not limitation, a preferred embodiment of the invention. Such embodiment does not necessarily represent the full scope of the invention, however, and reference must therefore be made to the claims for interpreting the scope of the invention.

BRIEF DESCRIPTION OF THE DRAWINGS

Reference is hereby made to the following figures in which like reference numerals correspond to like elements throughout, and in which.

DETAILED DESCRIPTION OF THE PREFERRED EMBODIMENT

Figure 1:
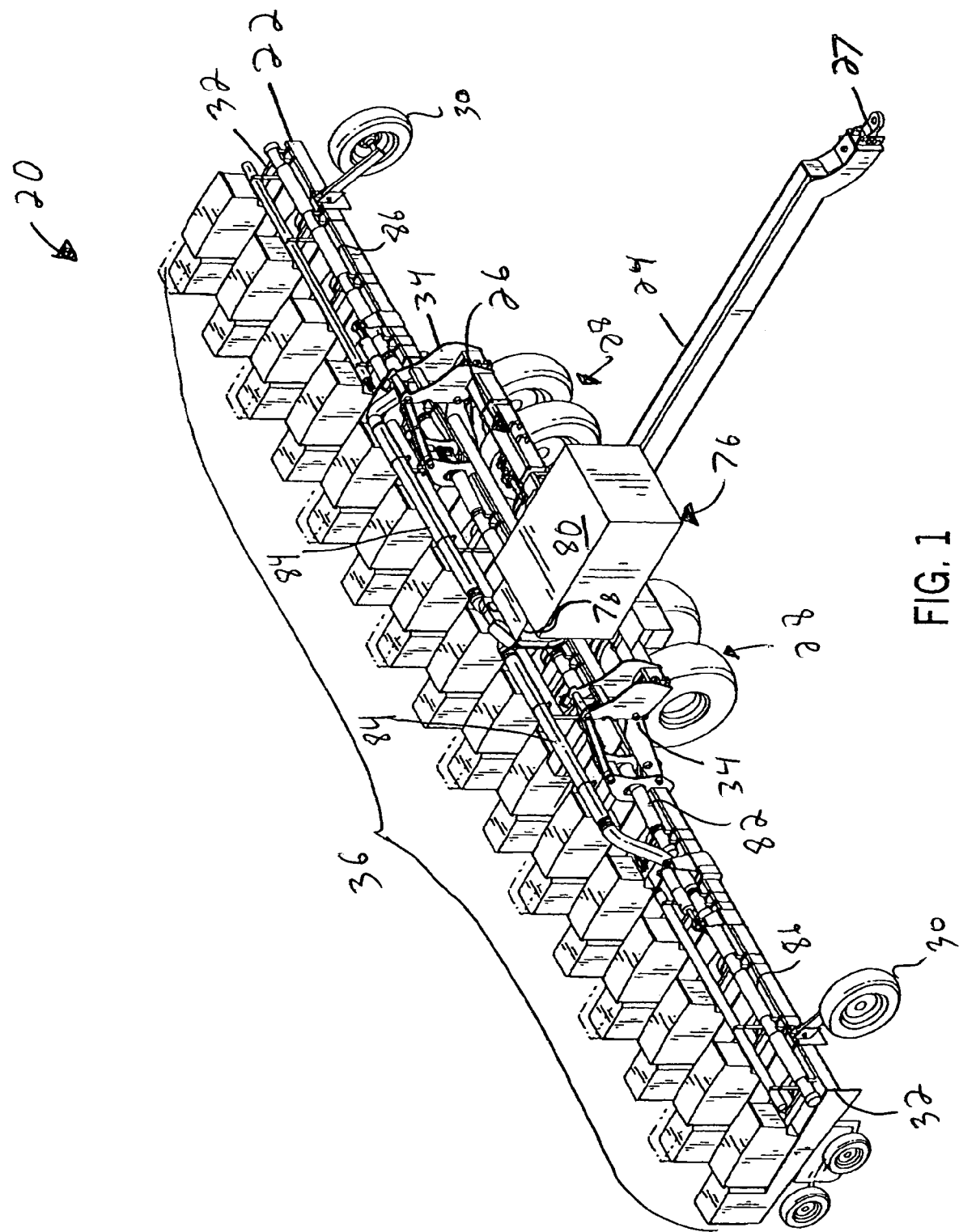
FIG. 1 is a schematic perspective view of a seed planting assembly supporting a plurality of seed planting units constructed in accordance with the preferred embodiment of the invention.

Referring to FIG. 1, a seed planting assembly 20 includes a laterally extending toolbar 22 connected at its middle to a forwardly extending tow bar 24. Tow bar 24 includes a connector 27 disposed at its longitudinally forward end and configured to mate with a corresponding hitch, or the like, of a towing tractor (not shown). Toolbar 22 is supported by a chassis 26 that is connected to tow bar 24 via a bracket assembly 34. Chassis 26 is supported on the ground by two pair of inner wheels 28 disposed on opposite sides of tow bar 24, and a pair of outer wheels 30 disposed proximal the opposing laterally outer ends 32 of toolbar 22.

A plurality of seed planting units (or row units) 36 extends longitudinally rearwardly from toolbar 22. In particular, each planting unit 36 includes a frame 37 that is connected to toolbar 22 via a hinge assembly 59 including upper and lower support beams 61 and 63, respectively, that are pivotally connected at one end to toolbar 22 and at the opposite end to frame 37 (See FIG. 2). As is well-known in the art, planting units 36 are mounted in a side-by-side (lateral) relation relative to each other along the toolbar 22. While sixteen such row units are illustrated in FIG. 1, the present invention contemplates that up to thirty-one row units can be assembled on a single toolbar 22 in accordance with the preferred embodiment. During operation, forward movement of the tractor causes row units 36 to ride along the ground, forming furrows that receive seeds and are subsequently closed.

Figure 2:
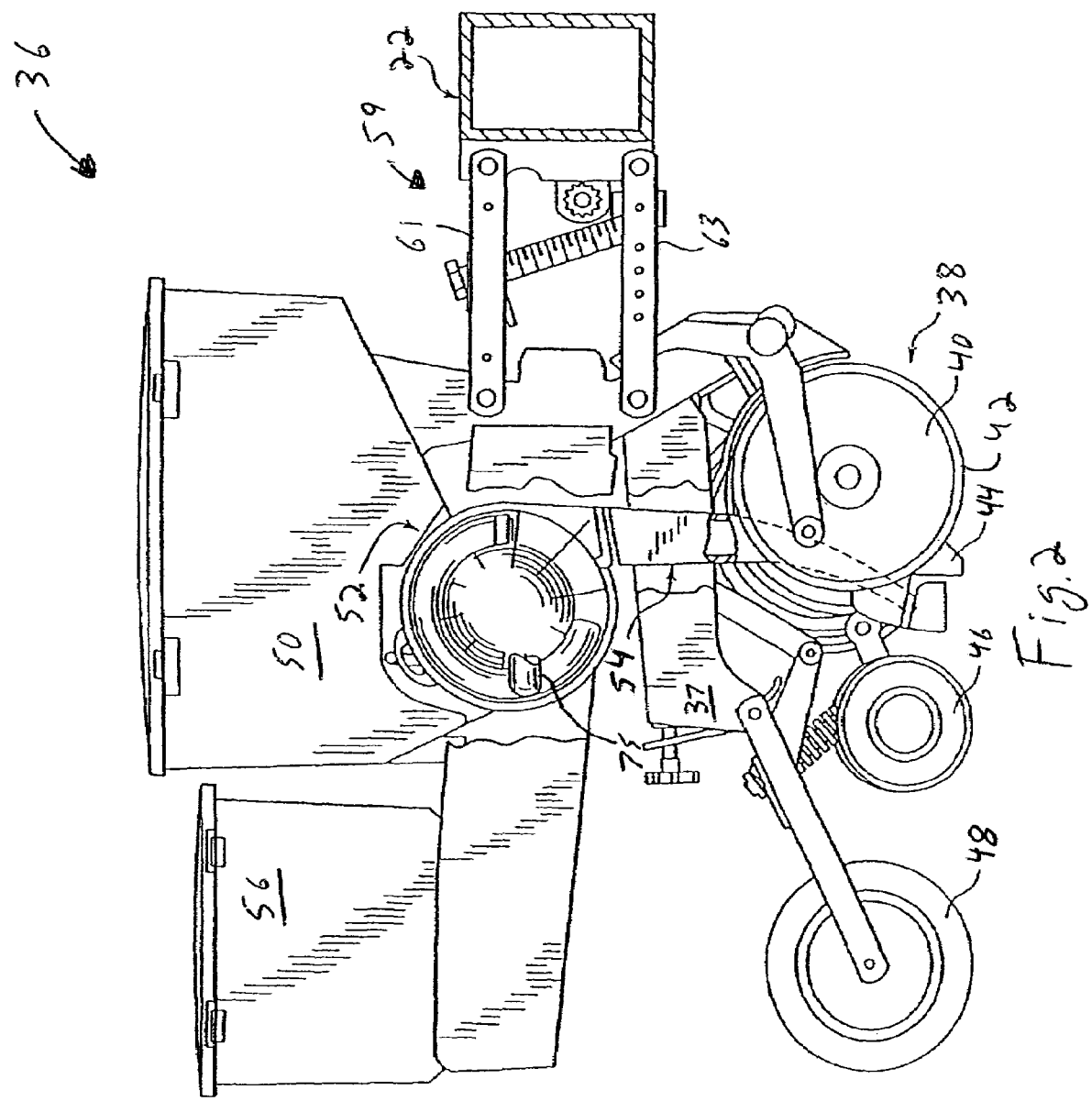
FIG. 2 is a side elevation view of a planting unit illustrated in FIG. 1 having a section cut away revealing a seed metering assembly.

Referring now also to FIG. 2, each planting unit 36 preferably includes a conventional furrow opening assembly, each of which including a pair of laterally spaced furrow opener discs 40 that define a converging furrow forming point 42, and an opener shoe 44 disposed rearwardly from furrow forming point 42. Opener shoe 44 preferably extends slightly downwardly from furrow forming point 42, and creates a trench in the middle of the furrow formed by opening discs 40. Alternatively, the planting unit 36 can be provided with a runner opener type for providing a furrow in the ground as is appreciated by one having ordinary skill in the art. Planting unit 36 further includes a pair of furrow closer discs 46 disposed rearwardly from opener shoe 44. A press wheel 48 is disposed rearwardly from closure discs 46.

Planting unit 36 further includes a seed hopper 50 that provides storage for seed material that is to be gravitationally deposited into the furrow that is formed as the furrow opening assembly moves across the field during operation. It should be appreciated, however, that a hopper container, smaller than container 50, can alternatively be connected to a centralized bin or large hopper in a conventional manner. In the illustrated embodiment, seeds are delivered from hopper 50 to a seed metering assembly 52 that acts under air pressure to the received seeds into a seed tube 54 at a uniform rate. Seed tube 54 defines a conduit having an outlet end immediately downstream of opener shoe 44 and upstream of furrow closer discs 46. Seed tube thus receives seeds from metering assembly and defines a substantially vertical passage through which the seeds are delivered into the furrow.

During operation, as the power source or tractor pulls the toolbar 12 across and over the ground, the furrow opening assembly 38 opens a furrow in the ground. Seeds from the hopper 50 flow into the seed metering assembly 52 in bulk and are subsequently deposited into the furrow via seed delivery tube 54 at a controlled rate. The furrow closer discs 46 trail the furrow opening assembly 38 and, as the seed planting unit 36 is drawn across the field, closes the furrow together and over the seed dispensed by the seed metering assembly 52. The trailing press wheel 48 compacts the soil closed over the deliver seeds.

Planting unit 36 can also be equipped with a pesticide hopper 56 that is mounted towards a rear end of the planting unit. Hopper 56 preferably includes an insecticide and is provided with conventional dispensing apparatus for applying controlled amounts of insecticide where desired in combination with the planting of seeds by each planting unit 36.

Figure 3:
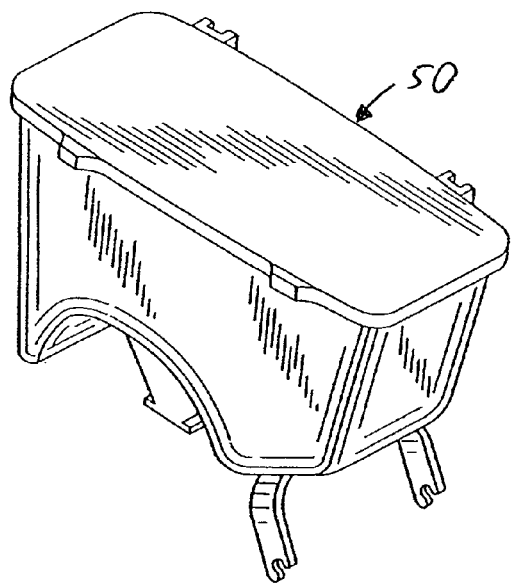
FIG. 3 is an assembly view of the air seed metering assembly illustrated in FIG. 2.
Figure 3:
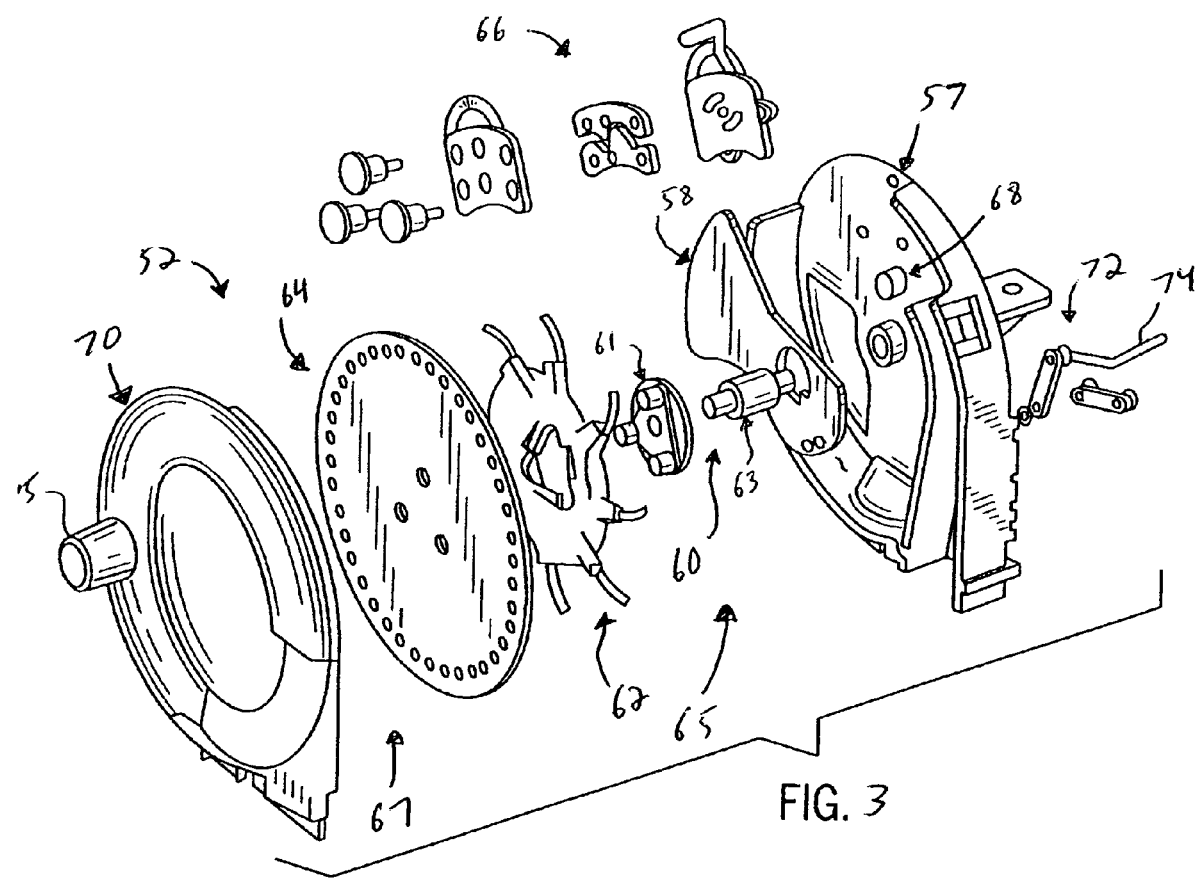

Referring to FIG. 3, the individual components of seed metering assembly 52 are schematically illustrated in accordance with the preferred embodiment. As illustrated, seed metering assembly 52 includes a housing 57 and a manually operated baffle assembly 58 that is operably adjusted from outside the housing 57. Metering assembly 52 further includes a drive assembly 60 that comprises a drive rotor 61 and driven shaft 63. Metering assembly 52 further includes an agitator 62 for inhibiting seeds from compacting within assembly 52, and a seed disc or plate 64 that operably divides the interior of assembly 52 into a seed chamber 65 and a vacuum chamber 67. Hopper 50 is removably connected to metering assembly 52, and delivers seeds into the seed chamber. A singulator assembly 66 inhibits more than one seed from being advanced by the seed plate or disc 54 to the discharged are of seed metering assembly 52. A vibrating mechanism 68 facilitates the release of seeds from disc 64 in the discharge area of seed metering assembly 52. A cover 70 closes seed metering assembly 52, and defines a mouth 75 that is coupled to an air moving system 76, as will be described in more detail below. A linkage assembly 72 is actuated by a lever 74 to control the disposition of seed baffle 58 which, in turn, controls seed flowage during operation.

The components of seed metering assembly 52 are further described in U.S. Pat. No. 6,109,193, the disclosure of which is hereby incorporated by reference. It should be appreciated that while a vacuum air metering assembly has been illustrated, air metering assembly 52 can alternatively be replaced with a positive pressure type air meter, and that the present invention can be used in combination with any air metering assembly.

Referring again to FIG. 1, each planting unit 36 can be coupled to an air moving system 76 that includes one or more air moving units (collectively identified as 78) enclosed in one or more housings (collectively identified as 80). While air mover unit(s) 78 are configured to provide negative pressure, they can alternatively function as blower units if a positive pressure seed metering assembly is implemented in planting units 36. In accordance with the preferred embodiment, more than one air moving unit 78 is installed, such that a select quantity of planting units 36 is operably connected to a first air mover while the remaining planting units 36 as connected to another air mover.

Air moving system 76 includes a lower tubing member 82 that is connected at its middle to one of the air moving units 78, and extends laterally outwardly therefrom in both directions. A plurality of openings (not shown) are formed in tubing member 82 that connect to a forward end 90 of a corresponding plurality of flexible intake tubes 88, each of which connecting to a metering assembly 52 of a planting unit 36 (in the manner illustrated in FIG. 5). Tube 82 is capped at its laterally outer ends, thereby enabling air mover unit 78 to pull all air through the metering assemblies 52 of all planting units 36 to which tube 82 is operably connected. Alternatively, lower tubing member 82 can be bifurcated to separate laterally extended tubing members, each of which being connected at its inner end to one or more blower units 78.

A bifurcated arrangement is illustrated with respect to a pair of upper tubing members 84 that are connected at their laterally inner ends to one or more air mover units 78. Tubing members 84 extend parallel to, and are disposed above, tubing member 82, and are connected at their outer ends to outer tubing members 86. Outer tubing members 86 are vertically aligned with lower tubing member 82, and extend across those planting units 36 that are disposed laterally outwardly with respect to lower tubing member 82. A plurality of openings (not shown) are formed in tubing members 86 that connect to a forward end 90 of a corresponding plurality of flexible intake tubes 88, each of which connecting to a metering assembly 52 of a laterally outwardly disposed planting unit 36 (See FIG. 5). Tube 86 is capped at its laterally outer ends, thereby enabling air mover unit 78 to pull all air through the metering assemblies 52 of all planting units 36 to which tube 86 is operably connected.

It should thus be appreciated that tubing member(s) 82 and intake tubes 88 provide a conduit placing the air mover unit 78 in communication with metering assemblies 52 of those planting units 36 operably connected to tubing member(s) 82. Likewise, tubing members 84 and 86 in combination with intake tubes 88 provide a conduit placing the air mover unit 78 in communication with metering assemblies of those planting units 36 operably connected to tubing members 86.

The number of air mover units 78 implemented in a given seed planting assembly depends largely on the number of planting units 36 and the airflow rating of each air mover unit. A sufficient pressure differential is desirable in the corresponding metering assembly 52 that achieves reliable operation, it being appreciated that increasing the pressure differential across metering zones 65 and 67 will, in turn, increase the reliability of the metering assembly 52. It has been determined that the installation of thirty-one planting units generally requires two air mover units 78 (one connected to tubing member(s) 82, and the other connected to tubing member(s) 84) that operate at approximately 20 to 30 inches of water.

Figure 4:
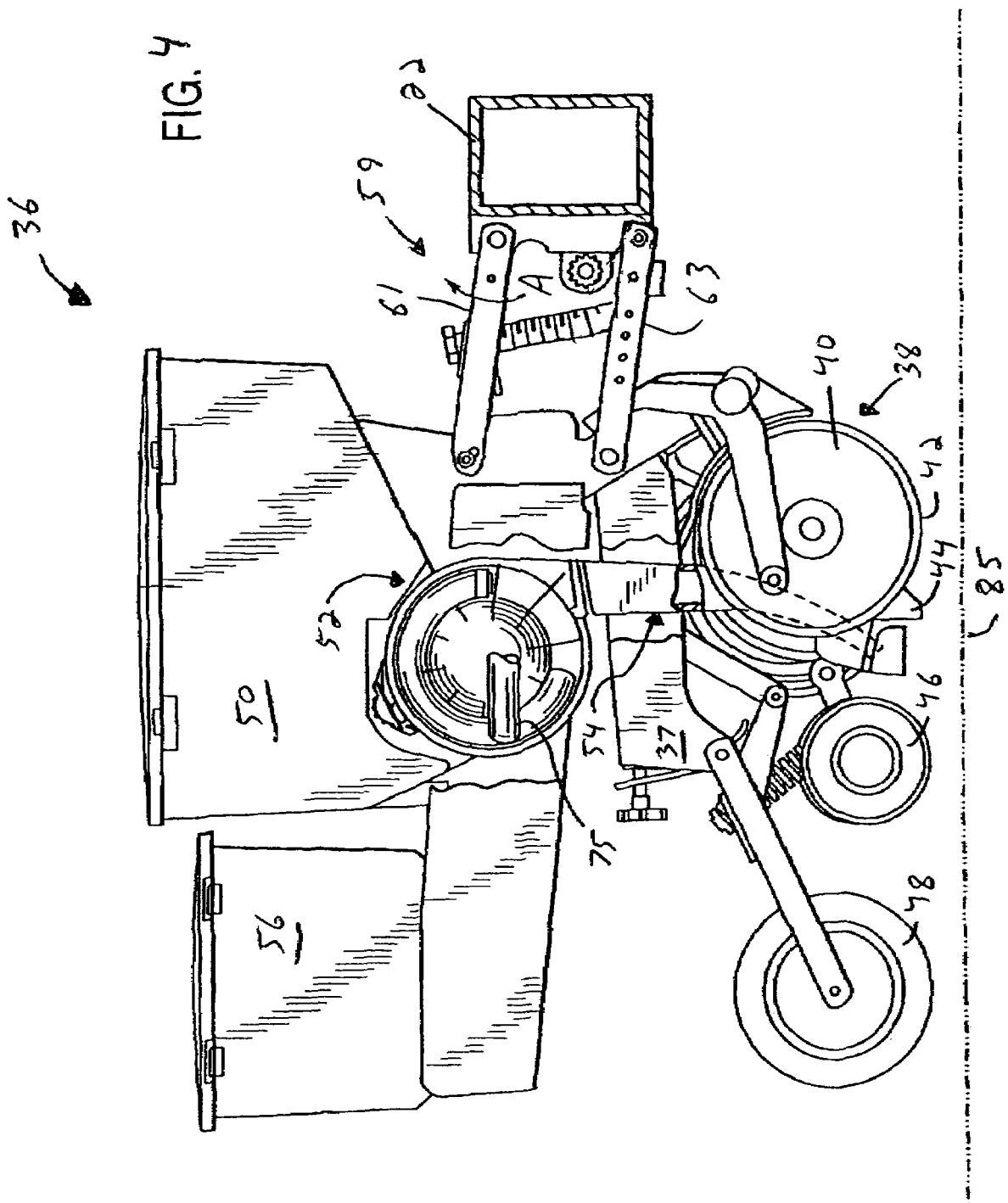
FIG. 4 is a side elevation view of the planting unit illustrated in FIG. 2 disposed in a raised position.

Referring now to FIG. 4, the present invention recognizes that certain seed types (for example, soybeans) are well suited to be planted in furrows that are laterally spaced a distance equal to the distance between adjacent furrow opening assemblies 38. However, in order to accommodate other seed types (for example, corn) that require additional distance between adjacent furrows in order to grow properly, it is necessary, from time to time, to deactivate certain planting units 36 on toolbar 22. In accordance with the preferred embodiment, every other planting unit can be disengaged from the ground 85, thereby doubling the distance between adjacent furrows compared to the distance that is achieved when all planting units are engaged.

In particular, each planting unit 36 can be translated upwardly such that furrow opening assembly 38 is suspended above the ground 85. Accordingly, raised planting units 36 will not form a furrow it the ground 85 when the seed planting assembly 20 is dragged across the ground 85. Planting units 36 can be lifted using any suitable lifting mechanism known by those having ordinary skill in the art to rotate support beams 61 and 63 clockwise in the direction of Arrow A about toolbar 22. Support beams 61 and 63 cause planting unit 36 to maintain its orientation generally parallel to the ground 85 when raised. Once raised, the position of the planting unit 36 can be locked using any conventional locking mechanism to prevent the unit from unintentionally lowering during operation. An arrangement whereby every other planting unit 36 is raised is illustrated in FIG. 1, in which each raised planting unit is identified by dashed lines.

It is appreciated that air mover unit(s) 78 are operable at a given flow rate that is divided among all planting units 36 connected to the air moving assembly 78. Accordingly, connecting raised planting units 36 to air moving assembly 76 reduces the airflow in metering assemblies 52 of those planting units 36 that remain engaged with the ground 85. The present invention recognizes the desirability to disconnect metering assemblies 52 of those raised planting units 36 from air moving assembly 76 in order to increase the air flow for the remaining planting units that are not raised, thereby further increasing the reliability of the corresponding active metering assemblies 52.

Figure 5:
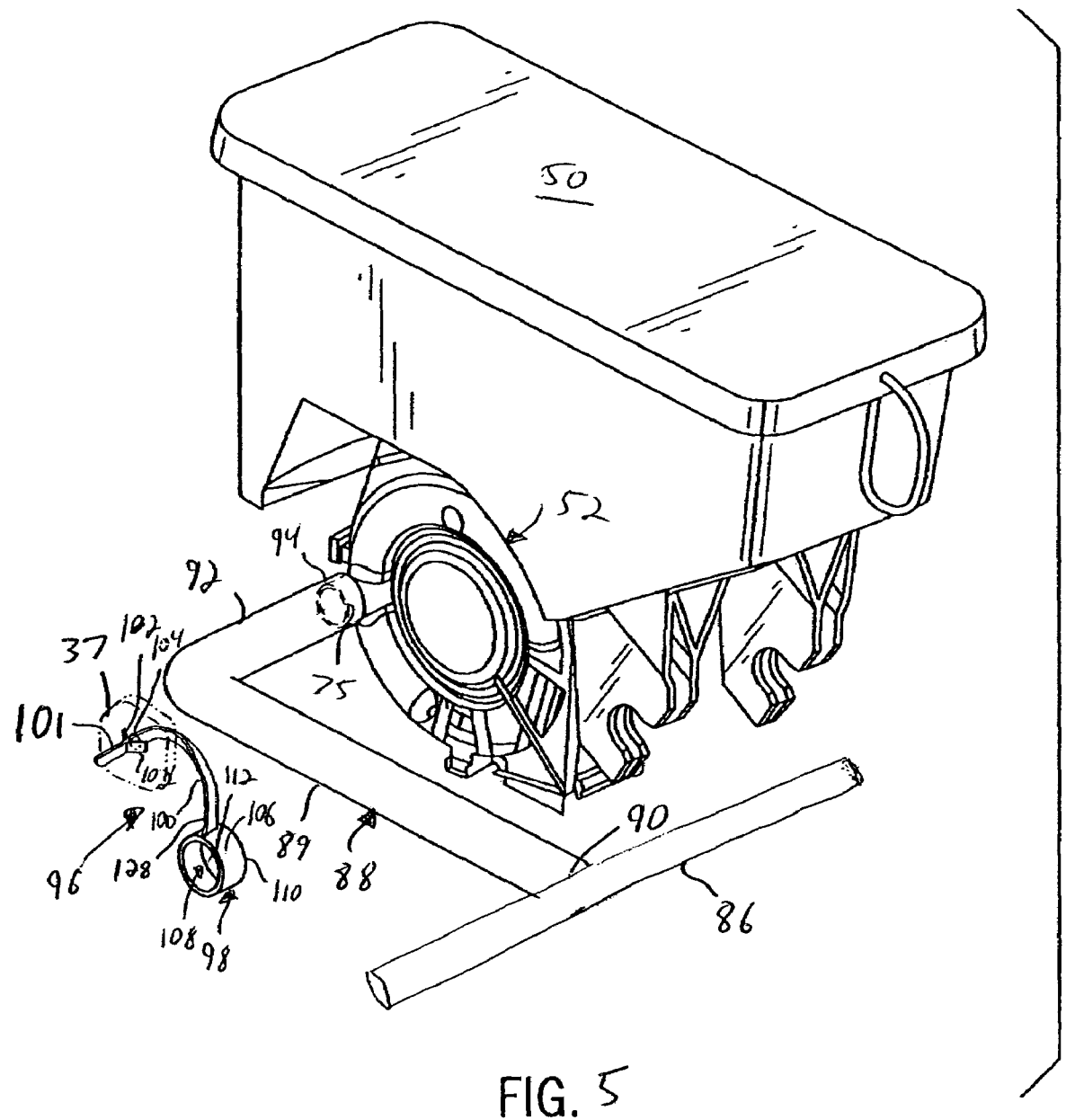
FIG. 5 is a perspective view schematically illustrating a portion of the planting unit including the air metering assembly illustrated in FIG. 3 operatively coupled to an air mover, and an air blocking assembly constructed in accordance with the preferred embodiment, wherein the air metering assembly is connected to the air mover and disconnected from the air blocking assembly.

Accordingly, referring now to FIG. 5, the mouth 75 of a metering assembly 52 corresponding to a laterally outwardly disposed planting unit 36 is connected to outer tubing member 86 via flexible intake tube 88. It should be appreciated that all metering assemblies 52 corresponding to planting units 36 can be connected to the air moving system 76 either via tubing member 86 as illustrated, or via tubing member 82 as described above. Intake tube 88 defines a longitudinal rearwardly extending portion 89 that is connected at an outer forward end 90 to tubing member 86. The opposite end of longitudinal member 89 terminates at a location generally in lateral alignment with mouth 75. Longitudinal member 89 is integrally connected to a laterally extending portion 92 having an outer end 94 that is connected to mouth 75. In particular, mouth 75 defines an outer diameter that increases along the direction from its outer end to the inner end proximal cover 70. Outer end 94 of laterally extending portion 92 defines an inner diameter that is substantially equal to the outer diameter of mouth 75 at its outer end such that outer end 94 can be pressure fit onto mouth 75, thereby forming an air-tight seal during operation. Alternatively, mouth 75 can define a constant outer diameter that tightly receives outer end 94. Intake tubing member 88 preferably comprises rubber or an alternatively suitably compliant material enabling easy installation and removal from mouth 75. The air-tight seal provided by outer end 94 and mouth 75 enables the air moving system 76 to draw air from metering assemblies 52 via tubing members 88, 86, and 84 during operation. The resulting negative air pressure enables each metering assembly 52 to operate as described above.

In order to disengage air moving system 76 from a planting unit 36, the present invention provides an air blocking assembly 96 that is attached to the frame 37 of each planting unit at a location proximal mouth 75 of the metering assembly 52. Assembly 96 preferably includes an end cap member 98 tethered to the frame 37 of planting unit 36 via a line 100. Cap 98 can be connected to a proximal end 128 of line 100 in any suitable manner. The distal end 102 of line 100 extends through an aperture 104 formed through frame 37. A pair of flanges 102 extends outwardly from distal end 101 and provides a barb having a wingspan that is greater than the aperture formed in frame 37. Flanges 102 are flexible to enable the distal end 101 and flanges 102 to be pulled through aperture 104 until flanges 102 snap outwardly, thereby preventing distal end 101 from being pulled out through aperture 104 during normal operation. The cap 98 is thereby fastened to frame 37 but can be removed by depressing flanges 102 before pulling line 100 out of the aperture 104. Cap 98 defines an annular body 106 having a first open end 108 and a second end 110 that is closed by an integral end wall 112.

Figure 6:
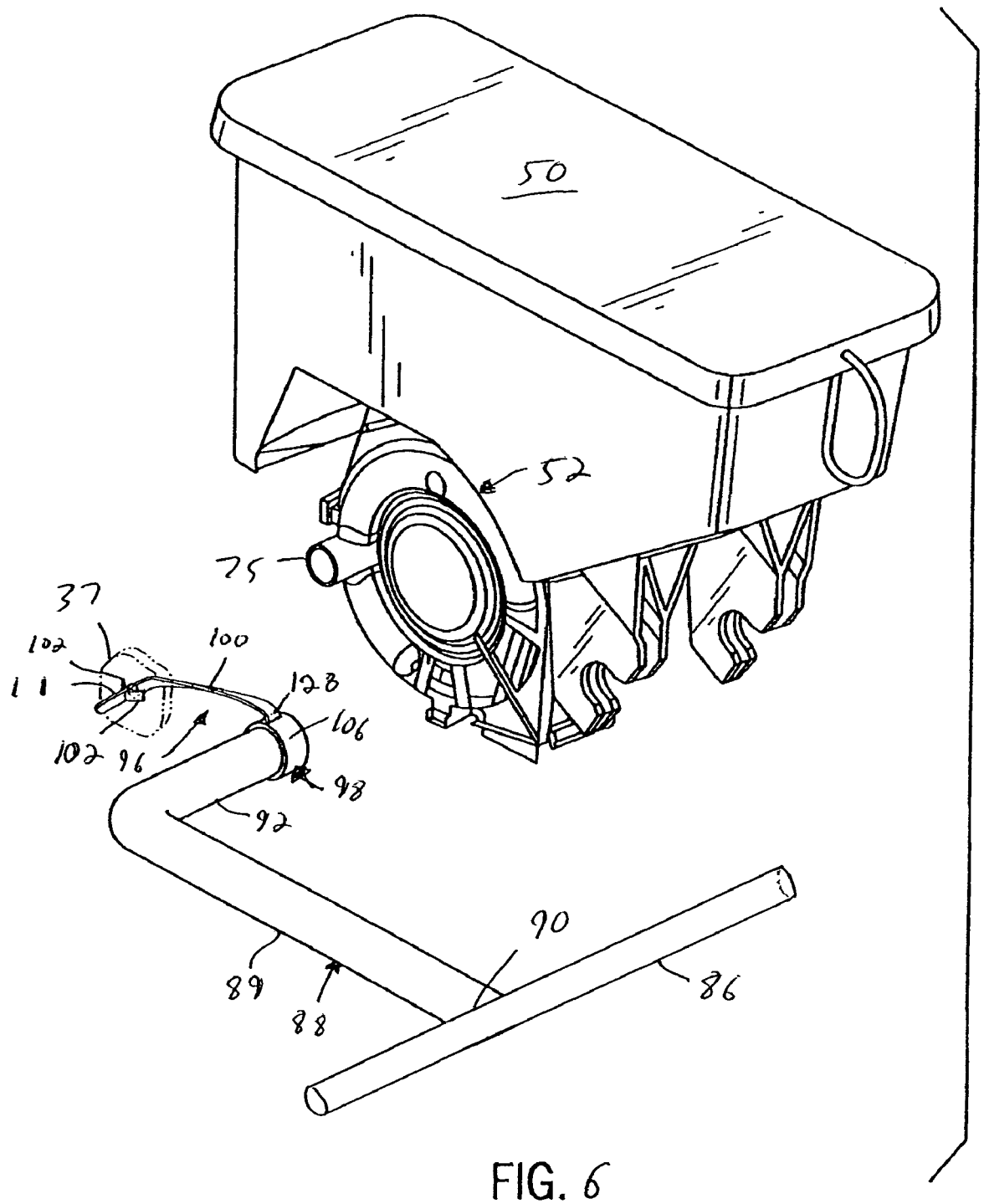
FIG. 6 is a perspective view similar to FIG. 5, but with the air metering assembly operatively disconnected from the air mover and instead connected to the air blocking assembly.

Accordingly, referring now to FIG. 6, when a planting unit 36 is raised, or if it is otherwise desirable to disconnect air moving assembly 76 from a planting unit, tubing member 88 can be manipulated to remove outer end 94 from mouth 75. Cap 98 is tethered to frame 37 a sufficient distance to enable outer end 94 of tubing member 88 to fit into open end 108 of cap 98. In particular, the inner diameter of cap 98 is substantially equal to, or slightly greater than, the outer diameter of end 94 to form an air-tight seal between cap 98 and outer end 94 that prevents air from being drawn through a portion of the conduit (i.e., tubing member 88) during operation. As a result, each planting unit that has been raised can be disengaged from the corresponding blower unit 78 which increases air flow to those planting units that remain engaged.

Figure 7:
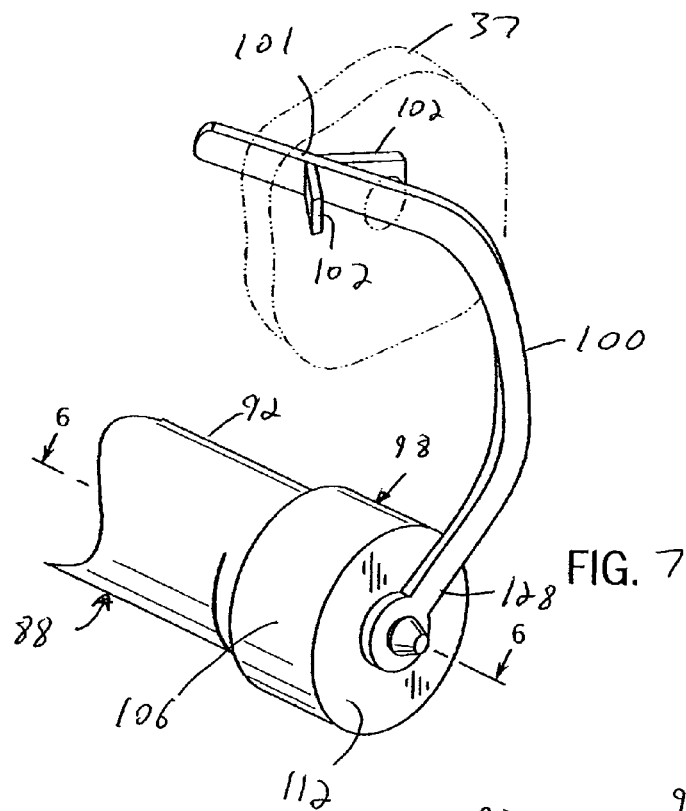
FIG. 7 is a perspective view of an air blocking assembly constructed in accordance with an alternative embodiment of the present invention.
Figure 8:
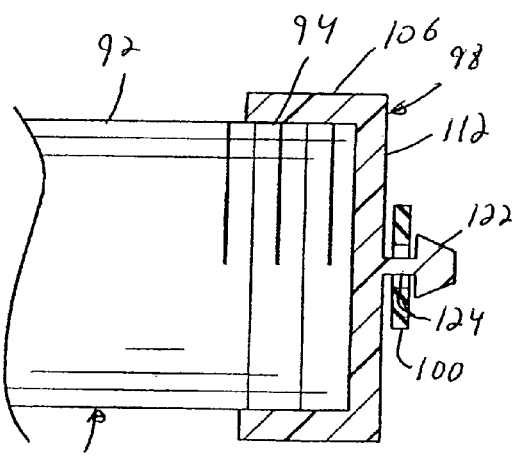
FIG. 8 is a sectional side elevation view of the air blocking assembly illustrated in FIG. 7.
Figure 9:
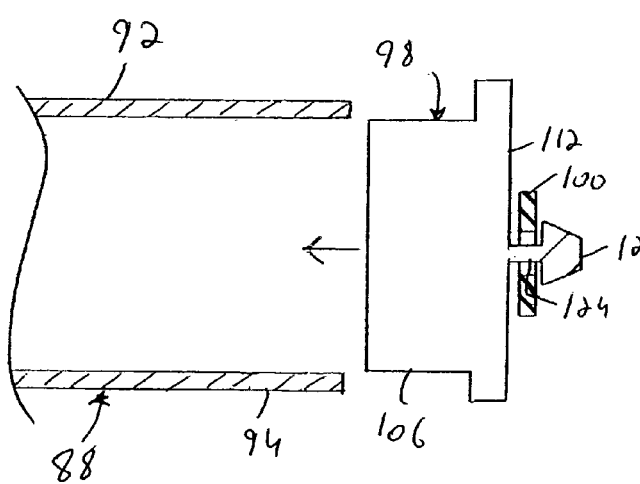
FIG. 9 is a side elevation view of an air blocking assembly constructed in accordance with yet another alternate embodiment of the invention.

It should be appreciated that the present invention contemplates numerous variations to the configuration of cap 98 and method for attaching the cap to outer end 94. FIGS. 7-9 illustrate additional embodiments that are not intended to limit the present invention, but rather are provided to illustrate that the present invention is not intended to be limited to any specific cap configuration and/or method of use.

Referring now to FIGS. 7 and 8, outer end 94 has a threaded outer surface in accordance with an alternate embodiment. Annular body 106 of cap 98 defines a threaded inner surface that mates 120 with threaded outer end 94 of intake tube 88. A retainer member 122 is connected to the outer surface of end wall 112 via a cylindrical connector 124. Line 100 defines a loop 126 at proximal end 128 opposite distal end 101 that fits around connector 124 to fasten line 100 to cap 98. Cap 98 is thus attached to intake tube 88 by rotating cap 98 clockwise to seal the outer end 94. Likewise, cap 98 is removed from tube 88 by rotating cap 98 counterclockwise.

Referring now to FIG. 9, cap 98 is connected to line 100 as described above with reference to FIGS. 7 and 8. In accordance with an alternate embodiment, annular body 106 presents an outer diameter that is substantially equal to, or slightly greater than, the inner diameter of outer end 94 such that cap 98 is inserted into outer end 94 rather than fitting over outer end as illustrated in FIGS. 6-8. Cap 98 thus provides a plug that prevents air from flowing through outer end 94.

A method of installing blocking assembly 96 in a conventional planting unit in accordance with the preferred embodiment includes drilling or otherwise forming aperture 104 through frame 37 at a location proximal open end 94 of intake tube 88. Next, the modified planting unit, which is now structurally equivalent to planting unit 36 illustrated and described above, is provided with blocking assembly 96 by pulling distal end 101 of line 100 through the aperture 104 until the flanges snap outwardly, thereby locking the line in place. The proximal end 128 of line is attached to cap in any of the configurations described and illustrated above.

A method of using the blocking assembly 95 in accordance with the preferred embodiment includes removing outer end 94 from mouth 75 in any conventional manner to disconnect the metering assembly 52 from air mover 78. Next, cap 98 engages the outer end 94 to seal intake tube 88 with respect to airflow. In particular, cap can be fit over the radial outer surface of outer end 94, can be threadedly attached to outer end 94, or can be plugged into outer end 94. When the metering assembly is to be re-connected to air mover 78, cap 98 is removed from outer end 94. Cap 98 remains tethered to frame 37 even when not in use. Next, outer end 94 is connected to mouth 75, thereby placing the metering assembly 52 of the planting unit in communication with air mover 78.

As described above, the combination of tubing members 82 and 88, and 86 and 88, each provide individual conduits to a corresponding plurality of planting units 36. Accordingly, it should be appreciated that the cap of the present invention can alternatively be attached to the conduit at any location suitable for blocking airflow to a predetermined planting unit. For instance, the cap can be attached to the opening formed in laterally tubing members 82 and 86 that provide the interface to tubing member 88 of a given planting unit 36. Thus the term "outer end of the conduit" is to be properly interpreted as any location at the conduit that can be blocked to selectively prevent airflow through the metering assembly 52 of a predetermined planting unit 36.

Advantageously, the increased airflow into engaged planting units allows engaged metering assemblies 52 to operate with increased reliability. Furthermore, individual planting units 36 can be selectively engaged or disengaged from the corresponding air mover 78 as opposed to conventional valve assemblies that require groups of planting units to be engaged or disengaged en masse. Additionally, the present invention requires only slight modification (i.e., drilling a small hole in the frame) of a conventional planting unit to install air blocking assembly 96 of the present invention.

The above has been described as a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. A seed planting assembly for forming a furrow, delivering seeds into the furrow, and closing the furrow, the assembly comprising:
    at least one planting unit including:
        A. a furrow opening assembly operable to create a furrow;
        B. a metering assembly operable to receive seeds and deliver seed into the furrow under forced air pressure, wherein the metering assembly includes an air inlet; and
        C. a furrow closing assembly disposed downstream of the furrow opening assembly operable to close the furrow;
    a conduit having a first end and a second end, the second end in removable communication with the meter assembly;
    an air moving assembly including an air moving unit coupled to the first end of the conduit; and
    an air blocking assembly comprising a sealing member configured to engage the second end of the conduit when the conduit is not connected to the metering assembly, the sealing member configured to prevent air flow through at least a portion of the conduit,
    wherein the air blocking assembly further comprises a cap having an open end that fits over the second end of the conduit, and wherein the cap has a closed end providing the sealing member.

2. The seed planting assembly as recited in claim 1, wherein the open end defines an inner diameter sized to provide a pressure fit with respect to the second end of the conduit.

3. The seed planting assembly as recited in claim 1, wherein the open end is threadedly connected to the second end of the conduit.

4. A method for disengaging a planting unit from an air moving unit of a seed planting assembly, wherein the planting unit is operable to form a furrow in the ground and deliver seeds to the furrow, and wherein the planting unit is coupled to the air moving unit via a conduit to regulate the seed deliver, the method comprising the steps of:
    disconnecting the conduit from the planting unit such that the conduit defines an open end; and
    placing a sealing member in engagement with the open end of the conduit.

5. The method as recited in claim 4, wherein the sealing member comprises a cap having an open end that fits over the open end of the conduit, and wherein the cap has a closed end providing the sealing member.

6. The method as recited in claim 4, further comprising forming a pressure fit between the sealing member and the open end of the conduit.

7. The method as recited in claim 4, further comprising threadedly connecting the sealing member to the open end of the conduit.

8. The method as recited in claim 4, further comprising tethering the sealing member to the planting unit.

9. The method as recited in claim 4, further comprising plugging the open end with the sealing member.

10. The method as recited in claim 4, wherein the sealing member is manually placed in engagement with the second end of the conduit.

11. A seed planting assembly for forming a furrow, delivering seeds into the furrow, and closing the furrow, the assembly comprising:
    at least one planting unit including:
        A. a furrow opening assembly operable to create a furrow;
        B. a metering assembly operable to receive seeds and deliver seed into the furrow under forced air pressure, wherein the metering assembly includes an air inlet; and C. a furrow closing assembly disposed downstream of the furrow opening assembly operable to close the furrow;
a conduit having a first end and a second end, the second end disposed at the meter assembly, the second end in removable communication with the meter assembly;
an air moving assembly including an air moving unit coupled at the first end of the conduit; and
an air blocking assembly comprising a seal configured to prevent air flow through at least a portion of the conduit, the seal engaged against the second end of the conduit when the conduit is not connected to the metering assembly.

12. The seed planting assembly as recited in claim 11, wherein the conduit further comprises a first tubing member in communication with the air moving unit at one end and a second tubing member at another end, wherein the second tubing member is configured for connection to the metering assembly.

13. The seed planting assembly as recited in claim 12, wherein the seal prevents air flow through the second tubing member.

14. The seed planting assembly as recited in claim 11 wherein the air blocking assembly is tethered to the at least one planting unit.

15. The seed planting assembly as recited in claim 11, wherein the air blocking assembly is connected to the at least one planting unit via a fastener.

16. The seed planting assembly as recited in claim 15, wherein the fastener defines a distal end that extends through an aperture extending through a planting unit frame.

17. The seed planting assembly as recited in claim 16, wherein at least one flange extends outwardly from the distal end and fits through the opening to lock the fastener in place.

18. The seed planting assembly as recited in claim 11, wherein the seal comprises a plug having an outer diameter sized to fit within the second end of the conduit.

19. The seed planting assembly as recited in claim 11, wherein the conduit comprises a first member connected to the air moving member, and a plurality of second members extending from the first member and connected to a corresponding plurality of planting units.

20. The seed planting assembly as recited in claim 11, wherein the sealing is manually placed in engagement with the second end of the conduit.

* * * * *